US012798704B2

(12) United States Patent
Hong et al.

(10) Patent No.: US 12,798,704 B2
(45) Date of Patent: Nov. 17, 2026

(54) MAGNETIC FOOT DEVICE OF A WALKING UNDERWATER ROBOT AND METHOD FOR SYNCHRONIZING MAGNETIC FORCE ACCORDING TO WALKING

(71) Applicant: Korea Institute of Robot & Convergence, Pohang-si (KR)

(72) Inventors: Young Jin Hong, Suwon-si (KR); Jae Yeon Choi, Siheung-si (KR); Man Gi Lee, Pohang-si (KR)

(73) Assignee: Korea Institute of Robot & Convergence, Pohang-si (KR)

( * ) Notice: Subject to any disclaimer, the term of this patent is extended or adjusted under 35 U.S.C. 154(b) by 332 days.

(21) Appl. No.: 18/425,286

(22) Filed: Jan. 29, 2024

(65) Prior Publication Data

US 2025/0242876 A1 Jul. 31, 2025

(51) Int. Cl.
*B62D 57/032* (2006.01)

(52) U.S. Cl.
CPC .................................. *B62D 57/032* (2013.01)

(58) Field of Classification Search
CPC ........................... B62D 57/032; B25J 15/0616
See application file for complete search history.

(56) References Cited

U.S. PATENT DOCUMENTS

2015/0148949 A1* 5/2015 Chin ........................ B25J 5/007 700/245
2024/0326936 A1* 10/2024 Wu ...................... B62D 57/032

FOREIGN PATENT DOCUMENTS

EP 3887252 A1 10/2021
JP 2003 260274 A 9/2003
KR 10 1351057 B1 1/2014
KR 10 1698050 B1 1/2017
WO WO-2015168173 A1 * 11/2015 .............. B25J 9/144
WO WO-2019155234 A1 * 8/2019 ........... B62D 57/024

* cited by examiner

*Primary Examiner* — George C Jin
(74) *Attorney, Agent, or Firm* — Westman, Champlin & Koehler, P.A.; Amanda M. Prose

(57) ABSTRACT

Provided is a magnetic foot device. The magnetic foot device may include: a first member movably connected to a robot; and a suction unit installed in the first member and turning on and off suction force sticking to a target. The magnetic foot device is provided with a synchronization unit that synchronizes a walking speed of the robot using the first member and on-off control of the suction force.

19 Claims, 7 Drawing Sheets

MAGNETIC FOOT DEVICE OF A WALKING UNDERWATER ROBOT AND METHOD FOR SYNCHRONIZING MAGNETIC FORCE ACCORDING TO WALKING

BACKGROUND

Field

The present disclosure relates to a foot structure and driving method for a walking underwater robot, and a suction force synchronization method.

On the other hand, the present invention was supported by the national research and development program as follows.

| | |
|---|---|
| Project identification number | 9991007931 |
| Department name | Multi-department |
| Name of project management organization | Agency for Defense Development |
| Research program name | Civil-military technology development project |
| Title of research project | Development of an underwater robot to remove fishing nets from the bottom of a ship |
| Contribution rate | 100% |
| Name of organization carrying out the project | KRISO |
| Research period | 2021.09.01~2026.07.31 |

Related Art

A robot that performs various tasks while attached to an object using magnetic force may be required.

For example, ships may be provided with robots to remove marine floating materials that has coiled or stuck to the bottom of the water.

The robot needs to perform the task of removing marine floating materials while attached to the ship, and to this end, a robot foot with a structure that may stick to the outer surface of the ship is required.

Korean Patent No. 1698050 discloses a robot having a contact unit that generates attraction pulling an object when a first power is cut-off, and releases the attraction when the first power is provided.

SUMMARY

An embodiment of the present disclosure provides a magnetic foot device that satisfies the conditions for a robot to walk stably in an underwater environment and a method for synchronizing magnetic force required to control the device.

The magnetic foot device of an embodiment of the present disclosure may include: a first member movably connected to a robot; and a suction unit installed in the first member and turning on and off suction force sticking to a target.

The magnetic foot device may be provided with a synchronization unit that synchronizes a walking speed of the robot using the first member and on-off control of the suction force.

According to the method for synchronizing magnetic force of an embodiment of the present disclosure, a switch may be physically manipulated so that the electromagnet of the magnetic foot sticking to the target is turned on by the pressing force of the robot applied to the target in the process of the magnetic foot of the robot stepping on the target.

According to the method for synchronizing magnetic force of an embodiment of the present disclosure, the switch may be physically manipulated so that the electromagnet is turned off due to the release of the pressing force in the process of the magnet foot being detached from the target.

When a walking underwater robot moves its position in a work environment with steel structures, unlike on the water, the external force caused by the flow of water around the robot and the buoyancy of the robot itself can have a significant impact on lowering work efficiency. Accordingly, there are cases where magnets are mounted on the feet of a robot to maximize movement efficiency. However, when the walking speed and the magnetic On/Off switching speed of the magnet are not well synchronized, the magnetic force is expressed at an inappropriate timing, causing physical collision with the steel structure, resulting in damage to the magnet mounted on the robot foot. In addition, unnecessary magnetic force causes overload on the robot ankles or other joints during a walking process, resulting in damage to the robot.

The magnetic foot device of an embodiment of the present disclosure can provide a structure and method of a horseshoe-type robot foot capable of synchronizing walking speed and magnetic force control without using a load cell, etc., in order to address an issue of a magnetic walking underwater robot.

The magnetic foot device of an embodiment of the present disclosure can solve an issue of synchronization between the walking speed and magnetic switching speed of a walking underwater robot through physical switching. In this connection, the physical switching can be accomplished by the pressing force of a robot applied to a target or foot when the robot steps on the target that needs to be stuck. When the robot performs an action of taking its foot off the target, the pressing force of the robot applied to the foot is released and switching in a reverse direction can be performed using the elastic force of a pre-installed spring.

In addition, according to an embodiment of the present disclosure, an improvement method of walking efficiency can be provided by securing the suction force of a magnetic robot foot for underwater work and bending and rotating the robot ankle.

The magnetic foot device of an embodiment of the present disclosure may provide a foot structure for an underwater walking robot. For example, the magnetic foot device can be fixed to be attached to the hull of a ship when the robot walks and may be formed to be detached from the hull when necessary.

The magnetic foot device of an embodiment of the present disclosure may include a second member of a ball joint structure fixed to a robot, and a first member formed to be rotatable around ae ball portion of the second member and connected to the ball portion of the second member.

The magnetic foot device of an embodiment of the present disclosure may be formed to provide a joint structure with a rotational freedom of 30 degrees or more. Additionally, the magnetic foot device of an embodiment of the present disclosure may include a portion to prevent posture sagging due to external force when there is no load.

The magnetic foot device of an embodiment of the present disclosure may have additional functions such as waterproofing considering the underwater environment, preventing slipping of a contact surface, and cushioning shock from walking.

DESCRIPTION OF EXEMPLARY EMBODIMENTS

Figure 1:
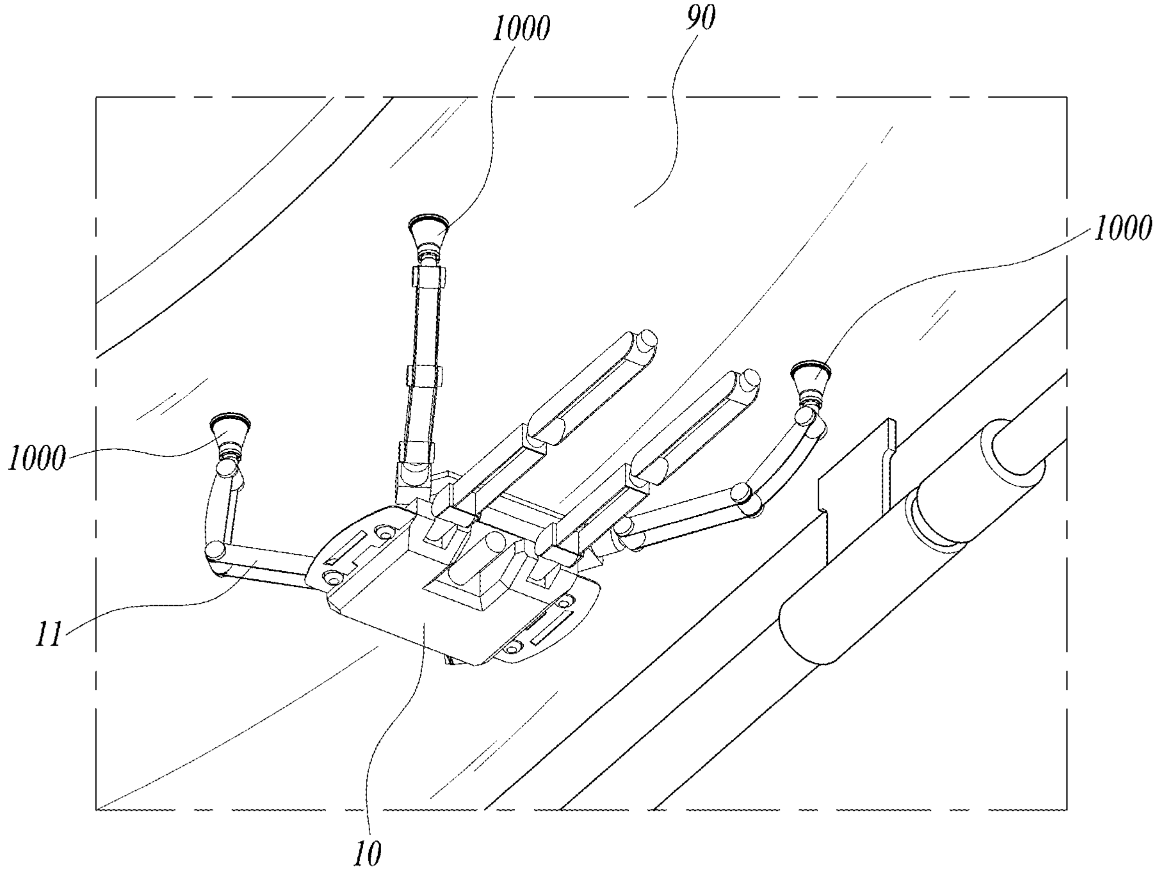
FIG. 1 is a schematic diagram illustrating a magnetic foot device installed on a robot.

Hereinafter, embodiments of the present disclosure will be described in detail with reference to the accompanying drawings so as to be easily carried out by those having ordinary skill in the technical field to which the present disclosure pertains. The present disclosure may, however, be embodied in various different forms and is not limited to the embodiments set forth herein. In addition, in the drawings, in order to clearly describe the present disclosure, parts that are not directly related to the description are omitted. Further, like reference numerals refer to like elements throughout the specification.

In the present specification, repeated descriptions of the same components will be omitted.

In addition, in the specification, it will be understood that when an element is referred to as being "connected" or "coupled" to another element, it can be directly connected or coupled to the other element or intervening elements may be present. In contrast, in the specification, when an element is referred to as being "directly connected" or "directly coupled" to another element, there are no intervening elements present.

Terms used in the specification are used to describe embodiments of the present disclosure and are not intended to limit the scope of the present disclosure.

In addition, in the specification, the terms in singular form may include plural forms unless otherwise specified.

In addition, in the present specification, it will be understood that the terms "comprising" or "having," when used herein, specify the presence of stated features, integers, steps, operations, elements, components, or combinations thereof, but do not preclude the presence or addition of one or more other features, integers, steps, operations, elements, components, or combinations thereof.

In addition, in the present specification, the term "and/or" includes a combination of a plurality of listed items or any of the plurality of listed items. In the present specification, the phrase "A or B" may be understood to include the possibilities of "only A," "only B" or "both A and B."

In addition, in the present specification, a detailed description of a known function and configuration which may make the gist of the present disclosure unclear will be omitted.

Figure 2:
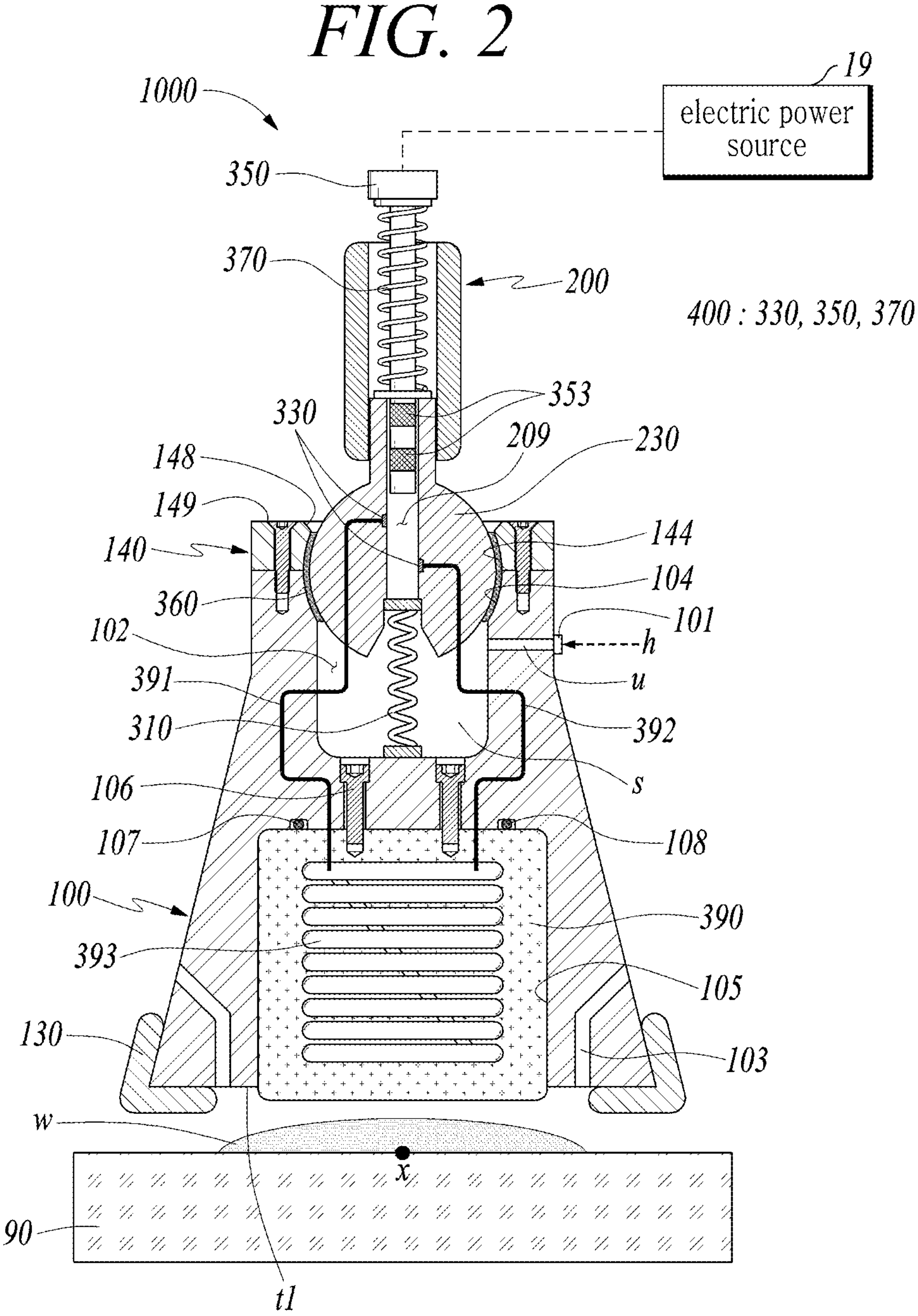
FIG. 2 is a schematic diagram illustrating the magnetic foot device of an embodiment of the present disclosure.
Figure 3:
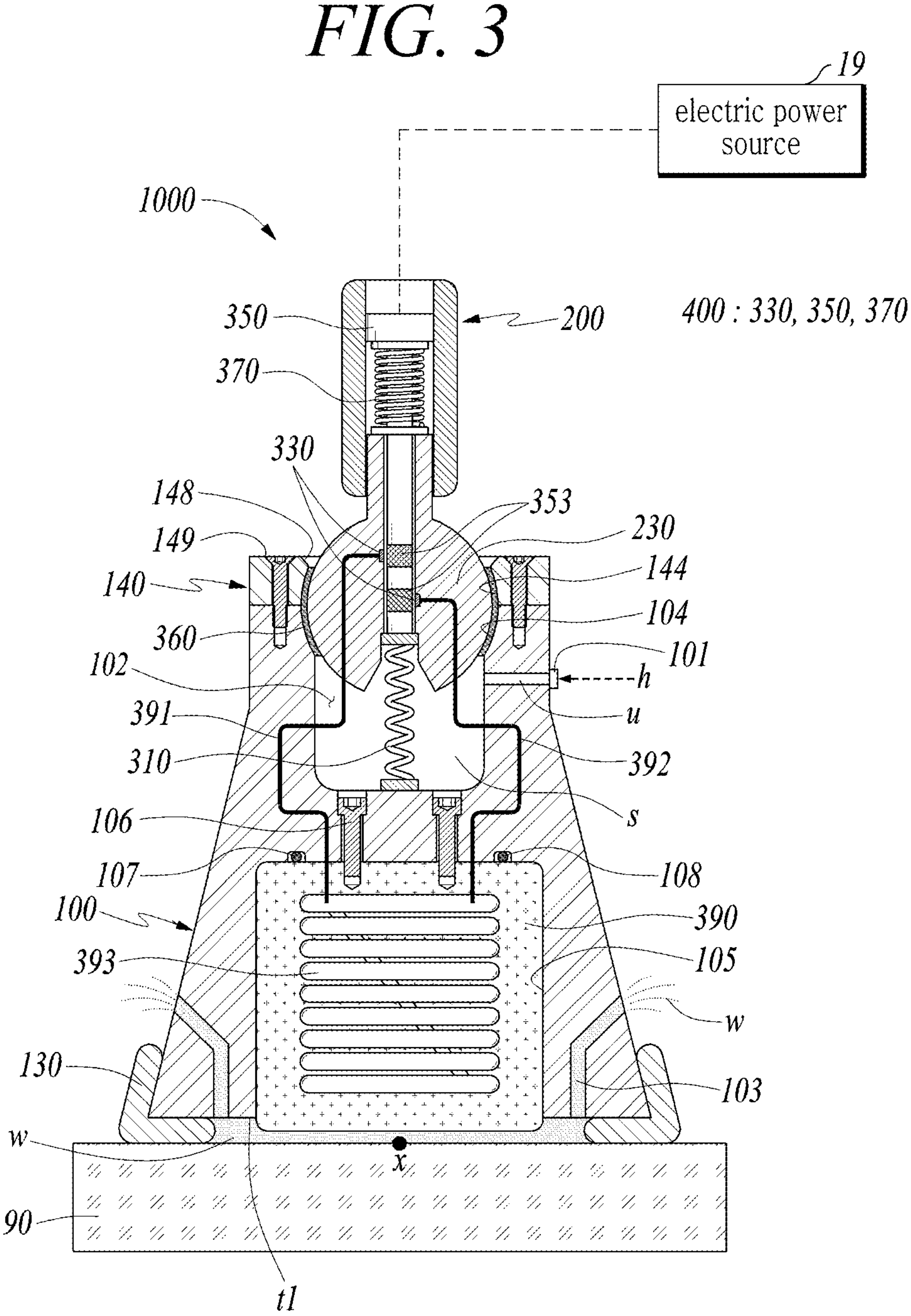
FIG. 3 is another schematic diagram illustrating the magnetic foot device of an embodiment of the present disclosure.
Figure 4:
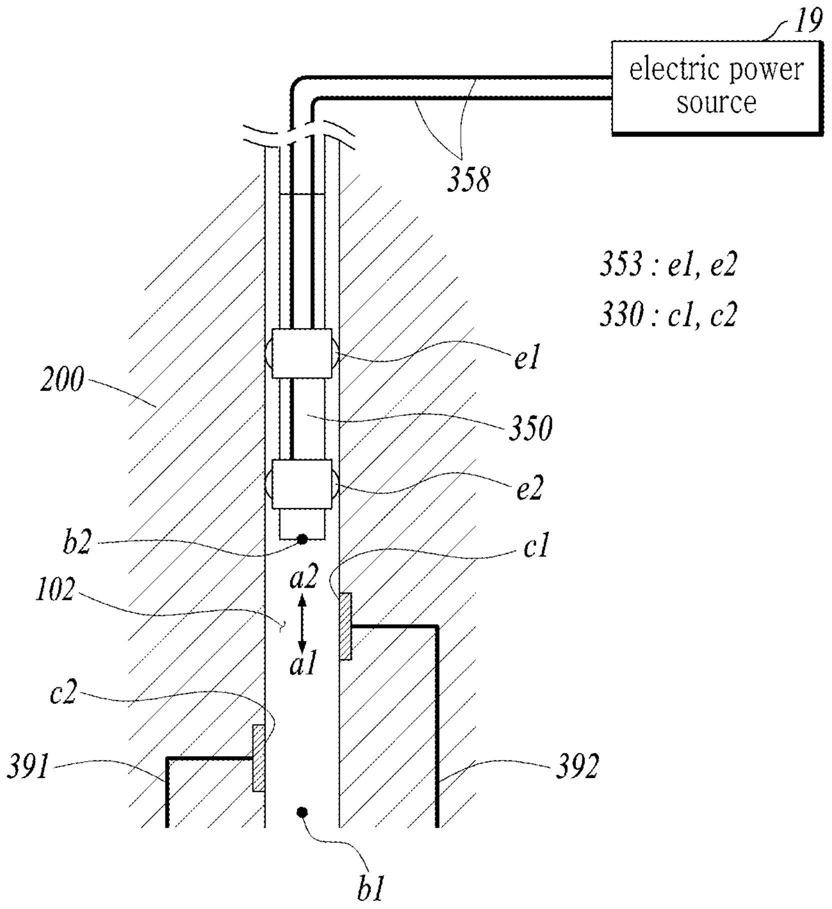
FIG. 4 is a schematic diagram illustrating a synchronization unit that turns off a suction unit.
Figure 5:
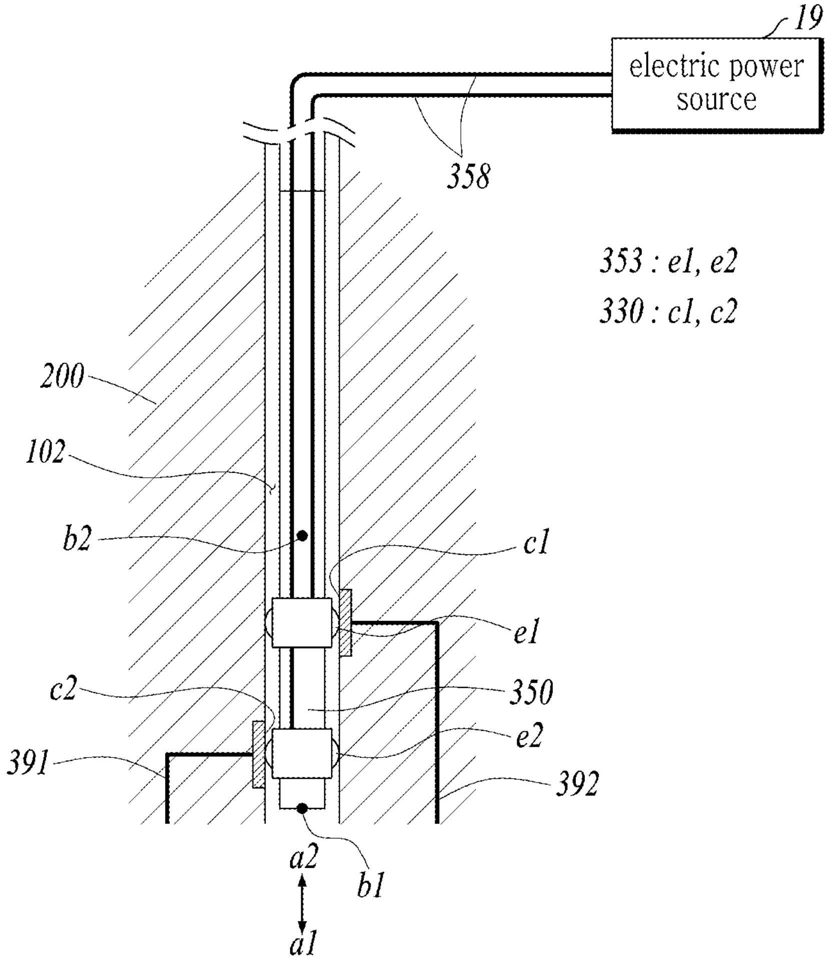
FIG. 5 is a schematic diagram illustrating the synchronization unit that turns on the suction unit.
Figure 6:
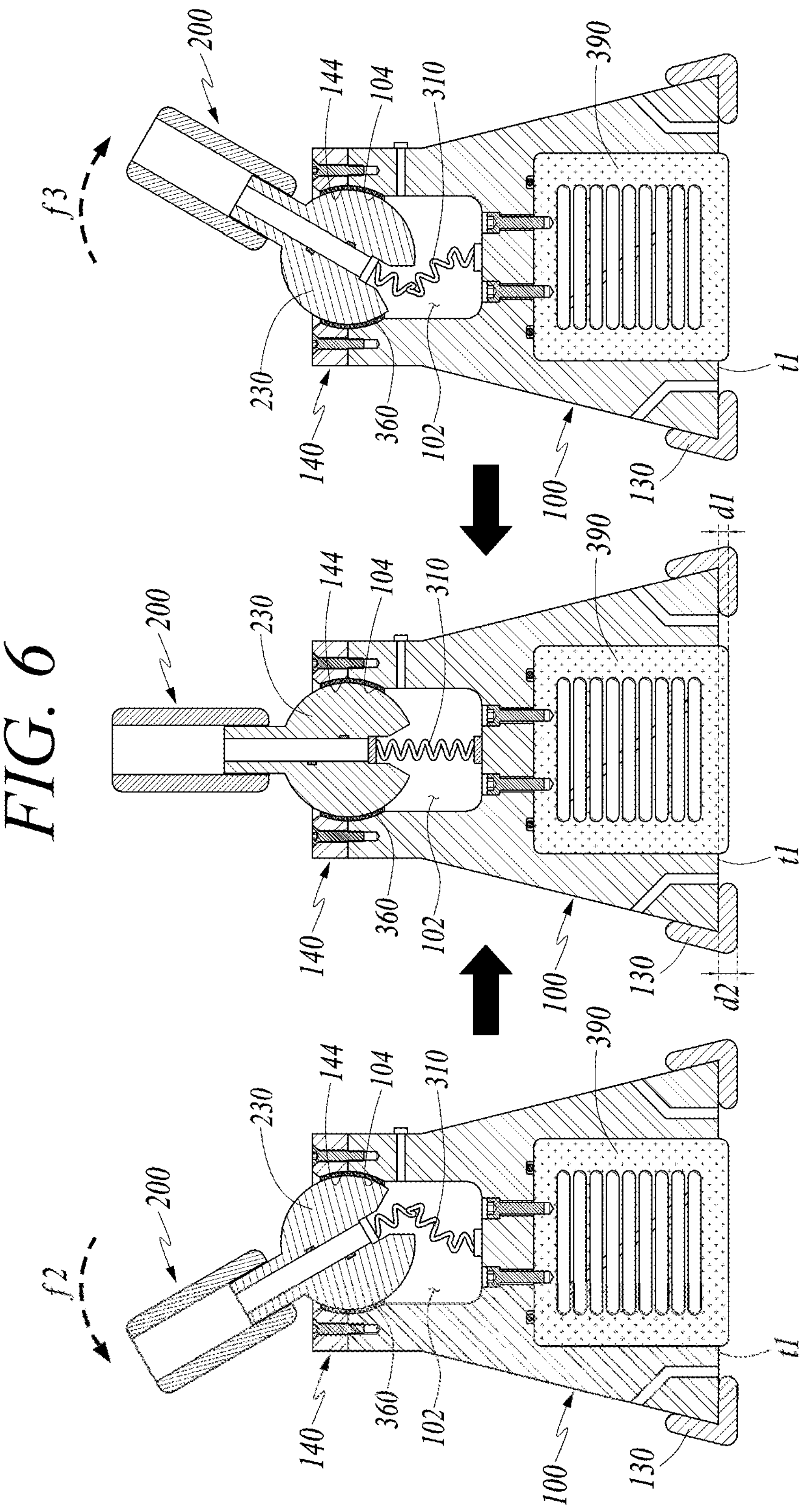
FIG. 6 is a schematic diagram illustrating the operation of a holding unit.
Figure 7:
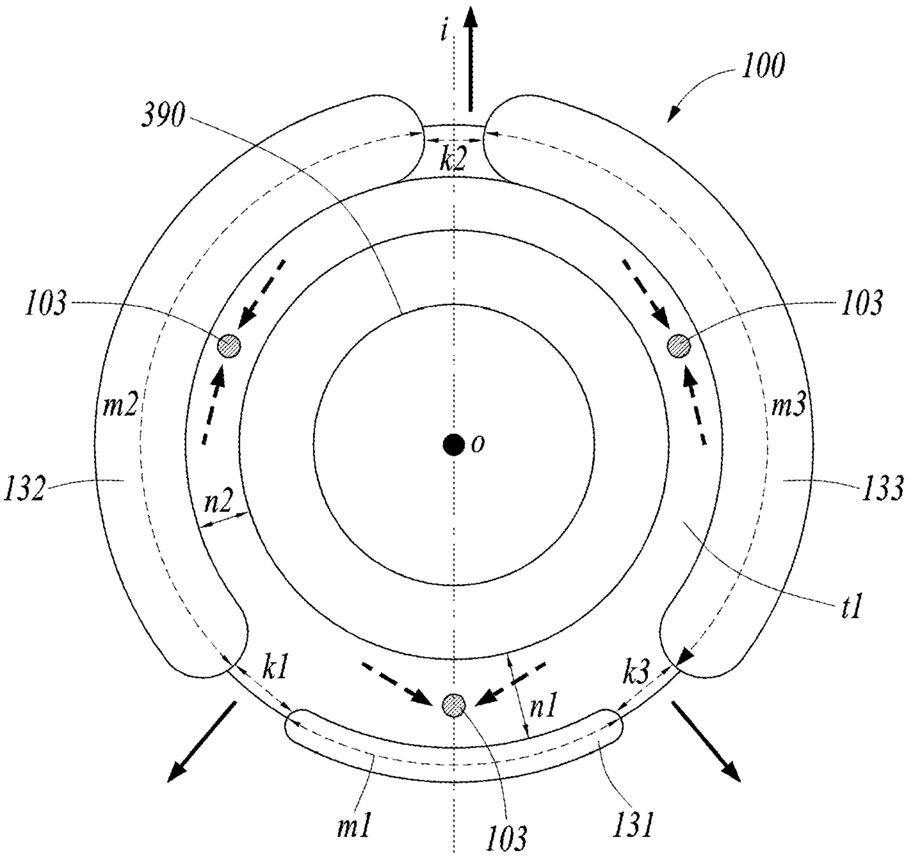
FIG. 7 is a schematic diagram illustrating the bottom of the magnetic foot device of an embodiment of the present disclosure.

FIG. 1 is a schematic diagram illustrating a magnetic foot device 1000 installed on a robot 10. FIG. 2 is a schematic diagram illustrating the magnetic foot device 1000 of an embodiment of the present disclosure. FIG. 3 is another schematic diagram illustrating the magnetic foot device 1000 of an embodiment of the present disclosure. FIG. 4 is a schematic diagram illustrating a synchronization unit 400 that turns off a suction unit 390. FIG. 5 is a schematic diagram illustrating the synchronization unit 400 that turns on the suction unit 390. FIG. 6 is a schematic diagram illustrating the operation of a holding unit 310. FIG. 7 is a schematic diagram illustrating the bottom of the magnetic foot device 1000 of an embodiment of the present disclosure.

The magnetic foot device 1000 is an element installed at the end of a leg 11 of the robot 10 and may form the so-called foot of the robot 10.

The magnetic foot device 1000 of an embodiment of the present disclosure may be in close contact with a target 90 such as the hull of a ship existing in an underwater environment. In the structure of the hull, the magnetic foot device 1000 may be used to hang upside down on the bottom of the hull.

For example, the underwater walking robot 10 equipped with the magnetic foot device 1000 may be provided. The underwater walking robot 10 may attach to the side or bottom of an inclined underwater hull, move to a target point by walking, and perform a given work task.

As an example, the robot 10 may have a total of four legs and two arms. Each leg may include three joints, and a total of four joint motors may be mounted on the three joints.

The ankle portion to which the robot foot of an embodiment of the present disclosure is connected may correspond to a passive joint type.

In conjunction with the walking pattern, the magnetic foot device 1000 may repeatedly attach and detach from the hull. For example, when the target 90 is a steel structure, the suction unit 390 capable of switching magnetic force (on/off) like an electromagnet may be formed on the sole of the foot of the robot 10 for walking.

In this connection, the robot 10 needs to be able to check whether the sole of the foot has touched the floor or the target 90 to determine the start time of the next walking motion. To this end, it is possible to check whether the robot 10 is in contact with the target 90 by checking the angles of all leg joints or by mounting a load cell or pressure sensor on the ankle or sole of the foot.

In this connection, in the case of an electromagnet, the suction force to the target 90 may be adjusted by supplying or blocking electric power source to a coil 393 for generating magnetic force. In the case of a permanent magnet, magnetic force may be adjusted by applying shunting by arranging the polarities (N/S) of two permanent magnets in a normal arrangement (N-N/S-S) or in a cross arrangement (N-S/S-N).

However, even when the timing of switching the magnetic force of the sole of the foot of the robot is slightly different from the walking speed of the robot 10, serious damage may occur to the foot of the robot 10. For example, when large magnetic force is suddenly generated even though the sole of the foot of the robot has not yet touched the ground, a physical collision occurs between the robot foot and the steel floor surface corresponding to the target 90 due to strong suction force, causing the magnet to break or causing damage to other joints connected to the ankle of the robot 10 due to the magnet on the sole of the foot that has not yet fallen. In other words, for normal walking, synchronization of the walking speed of the robot 10 and the magnetic switching speed is very important.

Moreover, when the surrounding environment in which the robot 10 walks is underwater, such as in sea water, the influence of external forces affecting the walking of the robot 10 according to the flow of water is much greater than on land. When using a separate sensor, it may be difficult to check whether the foot of the robot 10 is in contact with the target 90.

When the magnetic foot device 1000 corresponding to the ankle joint composed of passive joints is not restored to the initial posture (initial state) before the leg 11 of the robot 10 is attached to the hull, normal walking may become impossible or control of the robot 10 may be lost.

To address this issue and to be able to hang on the target 90 such as a ship hull tilted to the ground or upside down, the magnetic foot device 1000 may include a first member 100, the suction unit 390, and the synchronization unit 400.

The first member 100 may be movably connected to the robot 10. As an example, the first member 100 may be connected to the robot 10 to enable turning movement around a specific portion of the robot 10. In this connection, the turning movement may represent a turning movement centered on one point or a ball 230. For example, a movement in which a person spins with his or her arms outstretched, or shakes up and down or back and forth, may be considered a turning movement in the present specification.

The suction unit 390 may be installed in the first member 100. The suction unit 390 may stick to the target 90 using suction force such as magnetic force or negative pressure. The suction unit 390 may be formed to turn the suction force on and off. On of the suction force may indicate a state in which suction force is generated. Off of the suction force may indicate a state of eliminating the suction force or releasing the state of generating the suction force.

For example, when the target 90 is a magnetic object such as metal, the suction unit 390 may include an electromagnet. In addition, the suction unit 390 may include a permanent magnet, an electro permanent magnet (EPM), and an adsorption pad using a pressure difference.

The suction unit 390 may generate suction force that sticks to the target 90 according to the control of the robot 10 or the control of the synchronization unit 400 (the suction force is turned on). Alternatively, the suction unit 390 may release the suction force sticking to the target 90 according to the control of the robot 10 or the control of the synchronization unit 400 (the suction force is turned off). Through the generation and release of the suction force, the suction unit 390 or the first member 100 may repeat the action of attaching and detaching the target 90. In addition, using the same, the robot 10 may walk along the target 90 using the plurality of legs 11.

The synchronization unit 400 may synchronize the walking speed of the robot 10 using the first member 100 and the on-off control of the suction force. In other words, the synchronization unit 400 may turn on or off the suction force of the suction unit 390 according to the walking speed of the robot 10.

The robot 10 may alternately perform a close contact operation of bringing the first member 100 into close contact with the target 90 and a separation operation of separating the first member 100 from the target 90. For walking, the robot 10 can alternately repeat close contact and separation operations.

In this connection, the synchronization unit 400 may turn on the suction force during the close contact operation and turn off the suction force during the separation operation. In other words, the synchronization unit 400 may turn on the suction force of the suction unit 390 when a sole of a foot of the robot 10 contacts the target 90. The synchronization unit 400 may turn off the suction force of the suction unit 390 when the sole of the foot of the robot 10 is separated from the target 90.

As an example, the synchronization unit 400 may include a switch that determines on-off of the suction force.

The switch may be physically first switched by pressing force of the robot 10 applied to the first member 100 during the close contact operation.

The suction force of the suction unit 390 may be turned on by the first switching.

The switch may be elastically restored by a restoration member 370 during the separation operation and may be physically second switched.

The suction force of the suction unit 390 may be turned off by the second switching.

The switch may be formed to electrically connect an electric power source and the suction unit 390 by the first switching.

The switch may be formed so that the electrical connection between the electric power source and the suction unit 390 is released by the second switching.

When a second member 200 connected to the robot 10 is provided, the first member 100 may be movably connected to the second member 200. For example, the first member 100 may be connected to the second member 200 to enable turning movement around the second member 200.

The switch may basically operate to turn off the suction force.

The switch may be formed to turn on the suction force during an adhesion operation in which the robot 10 brings the first member 100 into close contact with the target 90.

The switch may be switched to turn on the suction force by the pressing force of the robot 10 applied to the second member 200 during the close contact operation. Alternatively, the switch may be switched to turn on the suction force by pressing force of the second member 200 applied to the first member 100 during the close contact operation.

The suction unit 390 is installed in the first member 100 and may include an electromagnet that sticks to the target 90 using magnetic force. In this connection, a first connection terminal 330 electrically connected to the electromagnet may be formed in the second member 200. The first connection terminal 330 may be electrically connected to the electromagnet through a first wire 391 and a second wire 392.

An electrode pin 350 that is electrically connected to an electric power source that provides electric power to the electromagnet may be provided.

The electrode pin 350 may be formed to be electrically connected to the first connection terminal 330 when moved in a first direction a1. Additionally, the electrode pin 350 may be formed so that the electrical connection to the first connection terminal 330 is released when moved in a second direction a2.

The restoration member 370 having elastic force may be connected to the electrode pin 350. As an example, the restoration member 370 may include various elastic members such as springs.

The electrode pin 350 may move in the first direction as the elastic force of the restoration member 370 is yielded through the close contact operation. The first connection terminal 330 and the electromagnet may be electrically connected to an electric power source by the electrode pin 350 moving in the first direction a1. The electromagnet may be driven by the electric power of the electric power source and the magnetic force (corresponding to the suction force) may be turned on.

The electrode pin 350 may move in the second direction due to the elastic force of the restoration member 370 restored through the separation operation. The electrical connection between the first connection terminal 330 and the electrode pin 350 may be released by the electrode pin 350 moving in the second direction a2. As a result, the electrical connection between the electromagnet and the electric power source may also be released, and the magnetic force (corresponding to the suction force) of the electromagnet that was generated using the electric power of the electric power source may be turned off.

As illustrated in FIGS. 2 to 4, a hollow 209 may be formed in the second member 200.

In this connection, the first connection terminal 330 may be formed on an inner wall surface of the hollow 209. The first connection terminal 330 may include a first terminal c1 formed on one inner wall surface of the hollow 209 and a second terminal c2 formed on the other inner wall surface of the hollow 209. The first terminal c1 may be electrically connected to the electromagnet through the first wire 391. The second terminal c2 may be electrically connected to the electromagnet through the second wire 392. To prevent short circuits, the first terminal c1 and the second terminal c2 may be formed at different positions in the direction in which the hollow 209 extends.

The electrode pin 350 may be inserted into the hollow 209.

A second connection terminal 353 electrically connected to the electric power source may be formed on an outer peripheral surface of the electrode pin 350. As an example, the second connection terminal 353 may include a first rolling member e1 in rolling contact with one inner wall surface of the hollow 209 and a second rolling member e2 in rolling contact with the other inner wall surface of the hollow 209. In this connection, the first rolling member e1 may be replaced with a sliding member (for example, a leaf spring, etc.) that slides along one inner wall surface of the hollow 209. The second rolling member e2 may also be replaced with a sliding member that slides along the other inner wall surface of the hollow 209.

The first rolling member e1 and the second rolling member e2 are connected to separate electric power lines 358 and may be electrically connected to an electric power source through the power lines 358.

Since the movement paths of the first rolling member e1 and the second rolling member e2 are opposite to each other, wear of the inner wall surface of the hollow 209 by each rolling member may be minimized. Additionally, the short circuit between the first rolling member e1 and the second rolling member e2 may be prevented. The second rolling member e1 and the second rolling member e2 may be formed at different positions in the extending direction of the hollow 209.

The electrode pin 350 may be formed to be movable along an extending direction of the hollow 209.

When the electrode pin 350 moves to a first position b1 in the extending direction of the hollow 209 as shown in FIG. 5, the second connection terminal 353 may be formed to be in face-to-face contact with the first connection terminal 330. In other words, at the first position b1, the first rolling member e1 may be formed at a position that is in face-to-face contact with the first terminal c1. At the first position b1, the second rolling member e2 may be formed at a position that is in face-to-face contact with the second terminal c2.

When the electrode pin 350 moves to the first position b1, the electromagnet may be connected to an electric power source through the first wire 391, the first terminal c1, the first rolling member e1, and the electric power line 358. Additionally, the electromagnet may be connected to an electric power source through the second wire 392, the second terminal c2, the second rolling member e2, and the electric power line 358. As a result, when the electrode pin 350 moves to the first position b1, the electromagnet can be electrically connected to the electric power source.

When the electrode pin 350 moves to a second position b2 in the extending direction of the hollow 209, the second connection terminal 353 may be formed to be released from contact with the first connection terminal 330 and be physically spaced from the first connection terminal 330.

The restoration member 370 may be formed to have restoring force such that the electrode pin 350 is disposed at the second position b2.

The electrode pin 350 may be physically pressed by the robot 10 during the close contact operation, and may be formed to overcome the restoring force of the restoration member 370 and move to the first position b1 by the pressing.

For example, when the first member 100 touches the target 90 and repulsive force begins to act due to the walking operation of the robot 10, the electrode pin 350 may be pushed toward the target 90 by the pressing force of the leg 11 of the robot 10. In this connection, the second connection terminal 353 formed on the electrode pin 350 may be in contact with the first connection terminal 330 formed in the hollow 209 of the second member 200, and electric power from an electric power source may be supplied to the electromagnet through each connection terminal. In other words, magnetic force may be generated only when the repulsive force with the target 90 is sufficient and the distance between the sole of the foot (first member 100) and the target 90 is sufficiently close. Conversely, when the magnetic force of the sole of the foot needs to be removed to move the position, the electrode pin 350 is lifted together with the robot 10 simply by slightly lifting the leg 11, thereby stopping the electric power supply to the electromagnet and demagnetizing the magnetic force of the electromagnet.

The first member 100 may be provided with a storage space s in which an adjustment fluid h for adjusting buoyancy of the first member 100 is stored. A flow path u connected to the storage space s may be formed in the first member 100. Additionally, a valve 101 that determines opening or closing of the flow path u may be provided.

An insertion groove 102 into which at least a portion of the second member 200 is inserted and installed may be formed on one surface of the first member 100 facing the second member 200. In this connection, the storage space s may be formed between the end of the second member 200 inserted and installed into the insertion groove 102 and the bottom surface of the insertion groove 102. The fluid h that adjusts the buoyancy of the first member 100 may be stored in the storage space s.

Since the robot 10 to which the magnetic foot device 1000 of an embodiment of the present disclosure is applied is the robot 10 that moves by walking in water, unlike the case of walking on land, depending on the buoyancy of the robot 10, a situation may occur in which the repulsive force between the target 90 and the sole of the foot is insufficient. For example, when the target 90 is below the robot 10, but the buoyancy of the robot 10 is greater than gravity and the force to keep rising in the water is strong, the force pushing the floor surface when the robot walks may be weakened. Another example is a situation where the target 90 is above the robot 10 and the robot 10 has to stand upside down and walk while being attached to the target 90. When the buoyancy force is weaker than gravity, the force pushing the target 90 while walking may be weakened.

According to an embodiment of the present disclosure, the fluid h having a set buoyancy may be injected into the storage space s. The amount of fluid h stored in the storage space s may be adaptively adjusted through control of the valve 101. The operation of the synchronization unit 400 may be performed normally through the fluid h injected into the storage space s.

When suction force is continuously required, such as when the robot 10 performs work while hanging from the ceiling, independently of the walking of the robot 10, a separate pressing portion may be additionally provided to forcibly position the electrode pin 350 at the first position b1 regardless of the walking operation.

The position where the suction unit 390 sticks to the target 90 may be defined as a suction position x.

In order for the robot 10 to move using the suction position x as a support point, the first member 100 may be formed to have a plurality of bent states with respect to the robot 10 with the suction unit 390 stuck to the target. For example, the first member 100 connected to the robot 10 enabling turning movement may have a degree of freedom to move like a human ankle. The bent state may represent the angle between the central axis of the robot 10 or the second member 200 to which the first member 100 is connected and the central axis of the first member 100.

The bent state of the first member 100 with respect to the robot 10 may be changed passively instead of being adjusted by active control of the first member 100 or the robot 10. So that the suction position may be accurately controlled by the robot 10, it is best that the point of the first member 100 or the suction unit 390 in contact with the target 90 is always constant. In addition, after the start of contact with the target 90, it is preferable that the change in the bent state of the first member 100 with respect to the robot 10, which occurs in the process of the first member 100 or the suction unit 390 being in full contact with the target 90, be constant.

When the suction unit 390 is detached from the target 90 to satisfy the condition, the holding unit 310 may be provided to restore a bent state of the first member 100 with respect to the robot 10 to an initial state. The holding unit 310 may always provide restoring force to restore the first member 100 to its initial state in a passive manner rather than controlling the robot 10. As an example, the holding unit 310 may include an elastic member such as a spring.

The holding unit 310 may have elastic force to return a bent state of the first member 100 with respect to the robot 10 to an initial state. The elastic force in this connection may correspond to the restoring force. The elastic force of the holding unit 310 may be set within a range that may overcome the self-weight of the magnetic foot device 1000 including the first member 100 and the suction unit 390 and restore the bent state of the first member 100 to its initial state.

A state in which the first member 100 is in close contact with the target 90 by the suction unit 390 may be defined as a close contact state.

In this connection, the holding unit 310 may be deformed by yielding to forces f2 and f3 of the robot 10 applied after the close contact state. Additionally, as the holding unit 310 is deformed, the bent state of the first member 100 with respect to the robot 10 or the second member 200 may change. To this end, the elastic force of the elastic member may be set within a range in which the holding unit 310 is deformed by yielding to the force of the robot 10. When the forces f2 and f3 of the robot 10 disappear, the deformed holding unit 310 may be restored to its original shape, and the first member 100 may be maintained in a state disposed straight (parallel) with respect to the second member 200 or perpendicular to the target 90.

One end of the holding unit 310 may be connected to the robot 10. The other end of the holding unit 310 may be connected to the first member 100.

The holding unit 310 may allow a change in the bending state of the first member 100 with respect to the robot 10. Simultaneously, the holding unit 310 may limit the yaw movement of the first member 100 with respect to the robot 10 to a set range.

For protection of the suction unit 390, the suction unit 390 may be installed in the center of one surface t1 of the first member 100 facing the target 90. In this connection, when the robot 10 steps on the leg 11, the first member 100 may contact the target 90 before the suction unit 390. In this way, when the yaw movement of the first member 100 occurs at the initial stage when the robot 10 steps on the leg 11, the robot 10 may step on a position other than the intended suction position by the angle at which the yaw movement occurs. However, according to this embodiment, the yaw movement of the first member 100 with respect to the robot 10 is limited, so the robot 10 may accurately step on a pre-designed suction position using the passively operated magnetic foot device 1000.

The yaw movement may mean a movement in which the first member 100 rotates around the axis of the leg 11 of the robot 10. For example, when a three-dimensional space formed by three axes x, y, and z orthogonal to each other is defined and the axis of the leg 11 is parallel to a z-axis direction, the yaw movement may indicate rotational movement around a z-axis, the so-called rotation.

In order to be applicable to various types of robots 10, the second member 200 fixedly connected to the robot 10 may be additionally provided.

The first member 100 may be connected to the second member 200 to enable turning movement around the second member 200. The second member 200 may be configured to be mounted on various types of legs 11. Thus, the first member 100 and the suction unit 390 may be applied to various types of robots 10 regardless of the structure of the legs 11.

The hollow 209 may be formed in the second member 200.

The insertion groove 102 may be formed on one surface of the first member 100 facing the second member 200. The second member 200 may be inserted and installed into the insertion groove 102. The second member 200 installed in the insertion groove 102 may be formed in the shape of the ball 230 to enable turning movement around the insertion groove 102. In this connection, the first member 100 and the second member 200 may take the form of a so-called ball 230 joint.

The holding unit 310 connected to the first member 100 and the second member 200 may be provided, and one end of the holding unit 310 may be inserted and installed into the hollow 209 of the second member 200. The other end of the holding uniter 310 may be connected to the bottom of the insertion groove 102.

The holding unit 310 installed at the bottom of the insertion groove 102 and the hollow 209 of the second member 200 may be minimized from exposure to the outside and protected from the surrounding environment. Thus, the characteristics, such as the inherent elastic force of the holding unit 310, may be maintained for a long period of time.

The first member 100 may be connected to the second member 200 to enable turning movement around the second member 200. To this end, the spherical ball 230 may be formed at the end of the second member 200. The second member 200 may be connected to the corresponding ball 230 to enable turning movement. The ball 230 and the second member 200 may form the so-called ball 230 joint.

The suction unit 390 may be installed in the first member 100 and may include an electromagnet that sticks to the target 90 using magnetic force. In this connection, a wire (including a conductive pattern) that supplies electricity to the electromagnet may be connected to the electromagnet. The wire may be pulled out from the electromagnet, pass through the first member 100, and extend to the second member 200.

The second member 200 of the electromagnet may be electrically connected to an electric power source provided in the robot 10. As a result, the electromagnet may be electrically connected to an electric power source through a wire or the second member 200 and receive driving electric power from the electric power source.

The suction unit 390, such as an electromagnet, may be provided in the center of one surface t1 of the first member 100 facing the target 90. One surface of the first member 100 facing the target 90 may be defined as a first surface t1.

A prevention portion 130 for preventing slippage of the first member 100 with respect to the target 90 is provided on one surface (first surface) t1 of the first member 100 facing the target 90 or at an edge of the first member 100. Alternatively, a discharge portion may be provided on the first surface or an edge of the first member 100 to discharge water w existing between the first member 100 and the target 90 to the outside.

As an example, the prevention portion 130 may include a rubber material or a urethane material that may increase friction force with the target 90. The prevention portion 130 may correspond to an element of the first member 100 that substantially contacts the target 90. The prevention portion 130 made of rubber or urethane may absorb some of the impact of attachment and detachment of the first member 100 from the target 90.

As illustrated in FIGS. 1 and 2, the prevention portion 130 may be formed at an edge of the first surface to surround a side surface t2 and the first surface t1 of the first member 100.

Additionally, as illustrated in FIG. 7, a plurality of prevention portions 130 may be formed along the outer periphery of the first member 100 while being spaced apart from each other.

A length direction of the robot 10 may be defined as a third direction. In this connection, an imaginary line i that crosses a center o of the first surface t1 and extends along the third direction may be assumed.

A first prevention portion 131 may be provided at the rear center of the first surface t1.

A second prevention portion 132 and a third prevention portion 133 may be provided to face each other with the imaginary line i therebetween.

On an outer circumference of the first surface t1, the first prevention portion 131 may be formed shorter than the second prevention portion 132 and the third prevention portion 133. In other words, an extension length m1 of the first prevention portion 131 may be shorter than an extension length m2 of the second prevention portion 132. The extension length m2 of the first prevention portion 131 may be shorter than the extension length m3 of the third prevention portion 133.

The first prevention portion 131 may be formed to cover less of the first surface than the second prevention portion 132 and may be formed to cover less of the first surface than the third prevention portion 133.

According to the above configuration, the gap between each prevention portion 130 may be densely formed at a position toward the rear of the robot 10. Due to various reasons, the feet of the robot 10 may contact the target 90 from the rear. In this connection, it is good that the water w located between the foot of the robot 10 and the target 90 flows out smoothly from the space between the first surface t1 and the target 90. This is because the water w may reduce the suction force of the magnetic foot device 1000 to the target 90. According to this embodiment, when the robot 10 steps on the target 90, the water w existing between the first surface t1 and the target 90 may be easily discharged to the outside through the gap between each prevention portion 130 formed centrally at the rear of the first surface t1.

In order to maximize the suction force for the target 90, the suction unit 390 may be formed to partially protrude from the first surface t1. As a result, a flow path for the water w may be formed between each prevention portion 130 and an outer wall of the protruding portion of the suction unit 390. According to this embodiment, the first prevention portion 131 may be formed to cover less of the first surface t1 than the other prevention portions 130. Accordingly, a width n1 of the flow path formed between the first prevention portion 131 and the suction unit 390 may be formed to be larger than a width n2 of the flow path due to the other prevention portions 130. Due to the difference in the cross-sectional area of a passage, the water w located on the first surface t1 and the target 90 may rush toward the first prevention portion 131 with less resistance and be discharged to the outside through a plurality of gaps densely formed on the first prevention portion 131.

The gap between the first prevention portion 131 and the second prevention portion 132 may be defined as a first gap k1.

The gap between the second prevention portion 132 and the third prevention portion 133 may be defined as a second gap k2.

The gap between the third prevention portion 133 and the first prevention portion 131 may be defined as a third gap k3.

In this connection, the first gap k1 may be formed to be larger than the second gap k2. Additionally, the third gap k3 may be formed to be larger than the second gap k2. The first gap k1 and the third gap k3 may be the same.

According to this embodiment, the water w rushed toward the first prevention portion 131 may be more easily discharged to the outside.

According to this embodiment, the first member 100 having a horseshoe-like shape may be provided, and the hydroplaning phenomenon may be minimized while securing friction force against the target 90.

A portion of the prevention portion 130 surrounding the edge of the first surface may have a shape that protrudes from the first surface toward the target 90. A protruding length d2 of the prevention portion 130 based on the first surface may be greater than a protruding length d1 of the suction unit 390. Accordingly, the phenomenon of the suction unit 390 coming into direct contact with the target 90 may be prevented and the suction unit 390 may be protected.

The discharge portion may include a vent hole 103. The vent hole 103 pushes or discharges the water w existing between the first member 100 and the target 90 to the outside, and thus, the hydroplaning phenomenon of water may be quickly reduced.

The vent hole 103 may extend through the inside of the first member 100 to the side surface t2 of the first member 100.

Water introduced into the vent hole 103 moves along an extending direction of the vent hole 103 and may be discharged to the side surface t2 of the first member 100.

A receiving groove 105 into which the suction unit 390 is inserted may be formed in the center of one surface (first surface) of the first member 100 facing the target 90. It may be beneficial to improve watertightness when the suction unit 390 is inserted while waterproofing synthetic oil is applied to the surface of the receiving groove 105.

Additionally, a watertight groove 107 in the shape of a closed curve may be formed on an inner or bottom surface of the receiving groove 105.

A watertight portion 108 may be installed in the watertight groove 107 to prevent the water w from flowing into the gap between the inner surface of the receiving groove 105 and the suction unit 390. As an example, the watertight portion 108 may include a sealing member such as an O-ring installed in the watertight groove 107.

The insertion groove 102 into which a portion of the ball 230 fixed to the robot 10 is inserted may be formed on one surface of the first member 100 facing the robot 10 or the second member 200. The ball 230 may be formed integrally with the second member 200 installed on the robot 10.

To form the ball 230 joint structure, an inner diameter of the insertion groove 102 may be formed to be smaller than a diameter of the ball 230. Additionally, an upper end of the insertion groove 102 (inner edge portion of an entrance) may be chamfered to match the outer surface shape and size (diameter, etc.) of the outer peripheral surface of the ball 230. The upper end of the insertion groove 102 chamfered in this way may form a first seating groove 104 in which a portion of the outer peripheral surface of the ball 230 is seated.

With a portion of the ball 230 seated in the first seating groove 104, a cover 140 may be provided to cover the remaining portion of the outer peripheral surface of the ball 230. A second seating groove 144 may be formed on one surface of the cover 140 facing the first seating groove 104 to match the outer surface shape and size (diameter, etc.) of the outer peripheral surface of the ball 230. When the cover 140 and the first member 100 are fastened using a first screw 149, a portion of the outer peripheral surface of the ball 230 may be supported by the first seating groove 104, and the remaining portion of the outer peripheral surface of the ball 230 may be supported by the second seating groove 144. Accordingly, the movement of the ball 230 along the extension direction (depth direction) of the insertion groove 102 may be restricted by the first seating groove 104 and the second seating groove 144. However, the ball 230 may rotate in various directions between the first seating groove 104 and the second seating groove 144, and thus, the first member 100 may be in a state of turning relative to the robot 10. From a different perspective, the second member 200 may be seen as performing turning movement relative to the first member 100.

A screw hole communicating with the receiving groove 105 formed on the opposite side of the first member 100 may be additionally formed at the bottom of the insertion groove 102. When the suction unit 390 such as an electromagnet is inserted into the receiving groove 105 and a second screw 106 is tightened through the screw hole, the suction unit 390 may be firmly screwed to the receiving groove 105 or the first member 100.

Between the first seating groove 104 and the ball 230 and between the second seating groove 144 and the ball 230, a buffer pad 360 may be inserted to alleviate the impact when the robot 10 steps on the first member 100 (corresponding to the foot) against the target 90. The buffer pad 360 may include a rubber or urethane material.

The inner edge of the upper end of the cover 140 opposite the second seating groove 144 may be chamfered. According to a chamfered surface 148 of the chamfered cover 140, physical interference that limits the rotation of the ball 230 may be alleviated and the rotatable range of the ball 230 may be expanded.

According to the magnetic foot device 1000 described above, a foot structure may be provided for the underwater walking robot 10 that allows the robot 10 to be attached to the hull of a ship when walking.

To minimize drag caused by currents, rapids, etc. in the underwater environment, the first member 100 may be formed in a cone shape.

The strength of the magnetic force of the electromagnet corresponding to the suction unit 390 may vary depending on the number of winding wires of an internal coil 393 and the supplied current. Even for electromagnets of the same strength, the suction force may vary depending on the application environment and the shape and area of the attachment surface. Accordingly, it is recommended that the electromagnet used in the magnet foot device 1000 be designed based on preliminary simulation results and manufactured adaptively to the target 90.

According to an embodiment of the present disclosure, a passive driving function may be mounted in which the first member 100 is restored to its initial state for the next step in a no-load situation other than the state in which the target 90 is attached.

In addition, according to an embodiment of the present disclosure, due to the prevention member 130 installed on the bottom of the first member 100 and the buffer pad 360 installed on the ball joint area, repeated attachment impacts to the target 90 may be absorbed doubly.

Although the embodiments of the present disclosure have been described in detail above, the scope of right of the present disclosure is not limited thereto, and various modifications and improvements made by those skilled in the art using the basic concept of the present disclosure defined in the following claims also fall within the scope of right of the present disclosure.

DESCRIPTION OF REFERENCE NUMERALS

| | |
|---|---|
| 10: Robot | 11: Leg |
| 90: Target | 100: First member |
| 101: Valve | 103: Vent hole |
| 102: Insertion groove | 105: Receiving groove |
| 104: First seating groove | 107: Watertight groove |
| 106: Second screw | 130: Prevention portion |
| 108: Watertight portion | 132: Second prevention portion |
| 131: First prevention portion | 140: Cover |
| 133: Third prevention portion | 148: Chamfered surface |
| 144: Second seating groove | 200: Second member |
| 149: First screw | 230: Ball |

-continued

| | |
|---|---|
| 209: Hollow | 330: First connection terminal |
| 310: Holding unit | 353: Second connection terminal |
| 350: Electrode pin | 370: Restoration member |
| 358: Electric power lines | 390: Suction unit |
| 360: Buffer pad | 392: Second wire |
| 391: First wire | 400: Synchronization unit |
| 393: Coil | |
| 1000: Magnetic foot device | |

What is claimed is:

1. A magnetic foot device, comprising:
a first member movably connected to a robot;
a second member connected to the robot;
a suction unit installed in the first member and turning on and off suction force sticking to a target;
the first member is connected to the second member to enable turning movement around the second member;
an electromagnet that is installed on the first member and sticks to the target using magnetic force is provided;
a first connection terminal electrically connected to the electromagnet is formed in the second member;
an electrode pin that is electrically connected to an electric power source that provides electric power to the electromagnet is provided;
the electrode pin is formed to be electrically connected to the first connection terminal when moved in a first direction;
the electrode pin is formed so that the electrical connection to the first connection terminal is released when moved in a second direction;
a restoration member having elastic force is connected to the electrode pin;
when an operation of the robot that brings the first member into close contact with the target so that the robot steps on the target is defined as a close contact operation, the elastic force of the restoration member is surrendered through the close contact operation and the electrode pin moves in the first direction; and
when the operation of the robot that separates the first member from the target to take its foot away from the target is defined as a separation operation, the electrode pin moves in the second member by the elastic force of the restoration member restored through the separation operation.

2. The magnetic foot device of claim 1, wherein the magnetic foot device is provided with a synchronization unit that synchronizes a walking speed of the robot using the first member and on-off control of the suction force.

3. The magnetic foot device of claim 1, wherein:
the robot alternately performs a close contact operation of bringing the first member into close contact with the target and a separation operation of separating the first member from the target; and
a synchronization unit is provided to turn on the suction force during the close contact operation and turn off the suction force during the separation operation.

4. The magnetic foot device of claim 1, wherein:
a synchronization unit is provided to turn on the suction force when a sole of a foot of the robot contacts the target; and
the synchronization unit turns off the suction force when the sole of the foot of the robot is separated from the target.

5. The magnetic foot device of claim 1, wherein:
a switch is provided to determine on-off of the suction force;
the robot alternately repeats a close contact operation of bringing the first member into close contact with the target for walking and a separation operation of separating the first member from the target;
the switch is physically first switched by pressing force of the robot applied to the first member during the close contact operation;
the suction force of the suction unit is turned on by the first switching;
the switch is elastically restored by a restoration member during the separation operation and is physically second switched; and
the suction force of the suction unit is turned off by the second switching.

6. The magnetic foot device of claim 5, wherein:
the switch is formed to electrically connect an electric power source and the suction unit by the first switching; and
the switch is formed so that the electrical connection between the electric power source and the suction unit is released by the second switching.

7. The magnetic foot device of claim 1, wherein:
the robot alternately performs the close contact operation of bringing the first member into close contact with the target and a separation operation of separating the first member from the target;
a switch is provided to determine on-off of the suction force;
the switch basically operates to turn off the suction force;
the switch is formed to turn on the suction force during an adhesion operation in which the robot brings the first member into close contact with the target; and
the switch is switched to turn on the suction force by pressing force of the robot applied to the second member during the close contact operation, or the switch is switched to turn on the suction force by the pressing force of the second member applied to the first member during the close contact operation.

8. The magnetic foot device of claim 1, wherein:
a hollow is formed in the second member;
the first connection terminal is formed on an inner wall surface of the hollow;
the electrode pin is inserted into the hollow;
a second connection terminal electrically connected to the electric power source is formed on an outer peripheral surface of the electrode pin;
the electrode pin is formed to be movable along an extending direction of the hollow;
when the electrode pin moves to a first position in the extending direction of the hollow, the second connection terminal is formed to be in face-to-face contact with the first connection terminal;
when the electrode pin moves to a second position in the extending direction of the hollow, the second connection terminal is formed to be released from contact with the first connection terminal and be physically spaced from the first connection terminal;
the restoration member is formed to have restoring force such that the electrode pin is disposed at the second position; and
the electrode pin is physically pressed by the robot during the close contact operation, and is formed to move to the first position by the pressing.

9. The magnetic foot device of claim 1, wherein the first member is provided with a storage space in which an adjustment fluid for adjusting buoyancy of the first member is stored;

a flow path connected to the storage space is formed in the first member; and a valve that determines opening or closing of the flow path is provided.

10. The magnetic foot device of claim 1, wherein:

a second member connected to the robot is provided;

an insertion groove into which at least a portion of the second member is inserted and installed is formed on one surface of the first member facing the second member; and a fluid that adjusts buoyancy of the first member is stored in a storage space formed between an end of the second member inserted and installed into the insertion groove and a bottom surface of the insertion groove.

11. The magnetic foot device of claim 1, wherein, when a position where the suction unit sticks to the target is defined as a suction position, the first member is formed to have a plurality of bent states with respect to the robot with the suction unit stuck to the target so that the robot moves using the suction position as a support point.

12. The magnetic foot device of claim 1, wherein, when the suction unit is detached from the target, a holding unit is provided to restore a bent state of the first member with respect to the robot to an initial state.

13. The magnetic foot device of claim 1, wherein:

a holding unit is provided, one end of which is connected to the robot and the other end of which is connected to the first member;

the holding unit has elastic force to return a bent state of the first member with respect to the robot to an initial state; and when a state in which the first member is in close contact with the target by the suction unit is defined as a close contact state, the holding unit is deformed by yielding to force of the robot applied after the close contact state, and as the holding unit is deformed, the bent state of the first member with respect to the robot changes.

14. The magnetic foot device of claim 1, wherein:

the second member is fixedly connected to the robot;

an insertion groove into which the second member is inserted and installed is formed in the first member;

the second member installed in the insertion groove is formed in a ball shape to enable turning movement around the insertion groove;

a hollow is formed in the second member;

a holding unit connected to the first member and the second member is provided;

one end of the holding unit is inserted and installed into the hollow of the second member;

the other end of the holding unit is connected to a bottom of the insertion groove;

the holding unit has elastic force to return a bent state of the first member with respect to the second member to an initial state; and when a state in which the first member is in close contact with the target by the suction unit is defined as a close contact state, the holding unit is deformed by yielding to force of the robot applied after the close contact state, and as the holding unit is deformed, the bent state of the first member with respect to the second member changes.

15. The magnetic foot device of claim 1, wherein:

a receiving groove into which the suction unit is inserted is formed in the center of one surface of the first member facing the target;

a watertight groove in the shape of a closed curve is formed on an inner or bottom surface of the receiving groove; and a watertight portion is installed in the watertight groove.

16. The magnetic foot device of claim 1, wherein:

the suction unit is provided in the center of one surface of the first member facing the target; and a prevention portion for preventing slippage of the first member with respect to the target is provided on one surface of the first member facing the target or at an edge of the first member, or a discharge portion is provided to discharge water existing between the first member and the target to the outside.

17. The magnetic foot device of claim 1, wherein, when one surface of the first member facing the target is defined as a first surface, a prevention portion is formed at an edge of the first surface to surround the side surface of the first member and the first surface together, and a plurality of the prevention portions are formed along an outer circumference of the first member while being spaced apart from each other.

18. The magnetic foot device of claim 1, wherein:

when a length direction of the robot is defined as a third direction and when an imaginary line that crosses a center of the first surface and extends along the third direction is assumed, a first prevention portion is provided at the rear center of the first surface;

a second prevention portion and a third prevention portion are provided to face each other with the imaginary line therebetween;

on an outer circumference of the first surface, the first prevention portion is formed shorter than the second prevention portion and the third prevention portion; and the first prevention portion is formed to cover less of the first surface than the second prevention portion and is formed to cover less of the first surface than the third prevention portion; and when a gap between the first prevention portion and the second prevention portion is defined as a first gap, the gap between the second prevention portion and the third prevention portion is defined as a second gap, and the gap between the third prevention portion and the first prevention portion is defined as a third gap, the first gap is formed to be larger than the second gap; and the third gap is formed to be larger than the second gap.

19. The magnetic foot device of claim 1, wherein, when one surface of the first member facing the target is defined as a first surface, a vent hole is formed to discharge water existing between the first member and the target to the outside;

the vent hole extends to a side surface of the first member; and water introduced into the vent hole moves along an extending direction of the vent hole and is discharged to the side surface of the first member.

* * * * *